Figure 1:
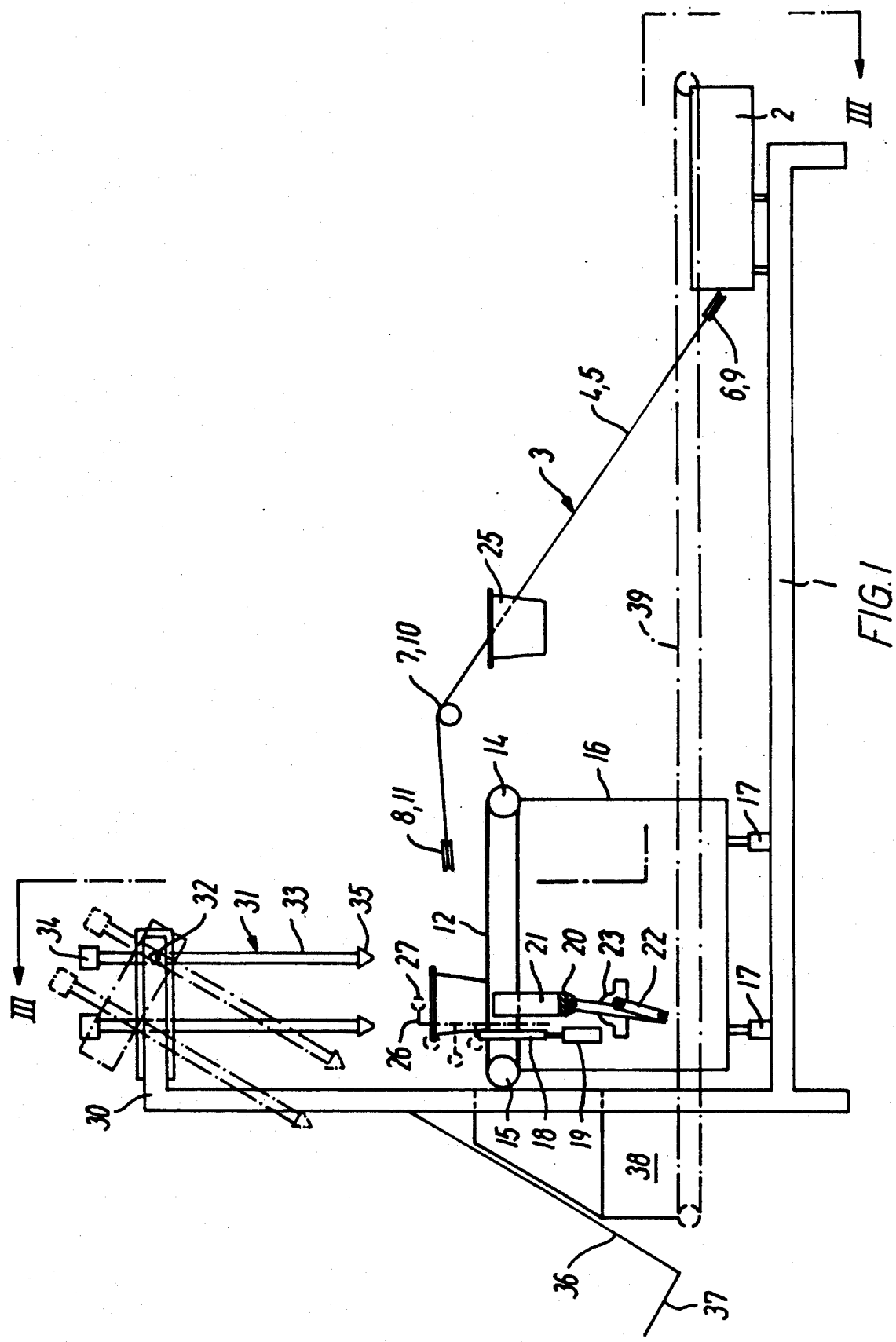

United States Patent [19]
Bryde-Hansen

[11] Patent Number: 5,192,181
[45] Date of Patent: Mar. 9, 1993

[54] MACHINE FOR STACKING CUP-SHAPED CONTAINERS

[76] Inventor: Bent Bryde-Hansen, No. 13 Knudsvej, DK-4623 Ll. Skensved, Denmark

[21] Appl. No.: 753,573

[22] Filed: Sep. 3, 1991

[30] Foreign Application Priority Data

Apr. 23, 1991 [DK] Denmark ............................... 743/91

[51] Int. Cl.⁵ ............................................. B65G 57/30
[52] U.S. Cl. ............................... 414/795.3; 414/788.2; 414/923; 414/934
[58] Field of Search .................. 198/395, 464.2, 464.4; 209/653/924; 414/790.5, 790.6, 788.2, 795.3, 923, 934

[56] References Cited

U.S. PATENT DOCUMENTS

| | | |
|---|---|---|
| 3,498,443 | 3/1970 | Weber . |
| 3,506,840 | 4/1970 | Fink ................................ 198/395 X |
| 3,623,593 | 11/1971 | Van Melle .................... 414/788.2 X |
| 3,764,025 | 10/1973 | Van Melle et al. . |
| 4,390,098 | 6/1983 | Wilgus et al. .................... 209/653 X |
| 4,819,784 | 4/1989 | Sticht .................................... 198/395 |
| 4,852,745 | 8/1989 | Lemaire et al. ...................... 209/588 |
| 5,069,019 | 12/1991 | Lodewegen .................. 414/790.5 X |

FOREIGN PATENT DOCUMENTS

| | | |
|---|---|---|
| 1756203 | 1/1970 | Fed. Rep. of Germany . |
| 484812 | 3/1970 | Switzerland . |
| 1195170 | 6/1970 | United Kingdom . |
| 1244294 | 8/1971 | United Kingdom . |
| 2224497 | 5/1990 | United Kingdom . |

OTHER PUBLICATIONS

Electrolux Systemtechnik AG 5 page leaflet, May 1988.

Primary Examiner—Michael S. Huppert
Assistant Examiner—Janice Krizek
Attorney, Agent, or Firm—Sughrue, Mion, Zinn, Macpeak & Seas

[57] ABSTRACT

The machine comprises an oscillating chute (2) and a conveyor (3) feeding containers (25) to a height-adjustable conveyor belt (12) consisting of a number of parallel belts (13). Photosensors (27) detect incorrectly placed containers which are allowed to continue to a chute (38) and are returned by a conveyor belt (39) to the oscillating chute (2). A displaceable stop (18) halts correctly placed containers are lifted into a stack holder (31) and retained by grippers (35) that may be rotated by a rotating cylinder (34), thereby releasing the container stack after the pile holder has been tilted against a stacking table (36).

11 Claims, 5 Drawing Sheets

MACHINE FOR STACKING CUP-SHAPED CONTAINERS

The invention relates to a machine for stacking cup-shaped containers. It comprises an oscillating chute and a conveyor feeding the containers in an upright position to a height-adjustable conveyor belt, a number of photosensors to detect, in connection with a programmable control unit the position of the container on the conveyor belt, a stop to halt a container under a stack holder which at its downwards facing end has releasable grippers, and a vertically displaceable stack disc for lifting said container to the stack holder. It also includes a structure for returning an incorrectly placed container to the oscillating chute.

A machine of this type is known from a leaflet issued by Electrolux Systemtechnik AG, Aarau, Switzerland, describing an ELCALOR stacking unit, type ST 170. In this prior machine incorrectly placed containers are removed from the height-adjustable conveyor belt, using compressed air to blow them into a pipe through which they are returned to the oscillating chute. Correctly placed containers are after the check of their position passed on by an additional conveyor belt to a fixed stop constituted by part of the depending stack holder, following which the stack disc is activated to press the container up into the stack holder where it is retained by the releasable grippers.

This design suffers from the drawback that the container, even when correctly placed on the height-adjustable conveyor belt, may be put out of its position during conveyance and therefore not be correctly placed on the stack disc upon insertion into the stack. If that is the case it is necessary to stop the machine in order to remove the incorrectly placed container. It is a further drawback that incorrectly placed containers are removed by means of compressed air as it is desirable, in particular when stacking containers intended for the foodstuffs industry, to avoid any risk of contamination of the containers during manufacture, stacking and packaging said containers.

The releasable grippers of the prior art machine are designed as ratchets or pawls pivoting about a trunnion. This design necessitates the manufacture and machine of the above mentioned type which does not suffer from the described drawbacks.

The machine according to the invention differs from the prior art machine in that the stack holder, the stop and the stack disc are positioned vis-á-vis that point of the height-adjustable conveyor belt where the position of the container is being detected, that the stop is movable between a passive and an active position allowing and preventing, respectively, the movement of the container past the stop, and that the stop is moved to its active position when the container is correctly placed on the height-adjustable conveyor belt. In this design the position of the container on the conveyor belt is detected when the container is directly below the stack holder. If its position is correct, i.e. the mouth of the container faces up and the container having not toppled over or turned upside down, the stop is activated, thereby preventing the container from being carried by the continuously travelling conveyor belt, following which the stack disc lifts the container up into the stack holder. If the container has not been correctly placed the stop remains in its passive position and the container is advanced beyond the discharge end of the height-adjustable conveyor belt and is returned to the oscillating chute.

A preferred embodiment of the machine according invention is characterized in that the height-adjustable conveyor belt comprises several belts spaced apart and extending in parallel, that the stop comprises at least two pins which in their active position project upwards between the belts above the upper side of the conveyor belt and in their passive position are located therebeneath, and that the stack disc is constituted by a number of spaced apart, vertical plates passing during the lifting movement of the disc from below through the interspaces between the belts. The above design of the height-adjustable conveyor belt allows the stop as well as the stack disc to be mounted in such a manner that in their passive positions they sit beneath the upper side of the conveyor belt and do not interfere in the conveyance of the containers, but are pushed upwards between the individual belts of the conveyor belt only when the container is to be stopped and inserted into the stack holder.

In a further embodiment the means for returning an incorrectly placed container may be a conveyor belt extending from the discharge end of the height-adjustable conveyor belt to the oscillating chute.

Therefore, the use of compressed air to remove incorrectly placed containers and to return them to the oscillating chute is avoided. This is particularly advantageous in case the containers are intended for foodstuffs.

In a second embodiment of the machine each of the fingers of the stack holder is a tube enclosing a shaft suspended at its top end by a turning means and at the lowermost end of the tube terminated by a downwards pointing cone whose base diameter is larger than the outer diameter of the tube, the cone having a plane surface that is parallel to the axis of the cone and is spaced apart therefrom a distance corresponding to the outer radius of the tube. The tube may have, at its lowermost end on the side facing away from the center line of the stack holder, a bore with a pressure pin restrained between the shaft and a leaf spring mounted on the external side of the tube. The grippers of the stack holder in this embodiment offers the advantage that only a very small number of movable parts is used and that these are easily replaceable.

The grippers function as follows. During the stacking of the containers the plane surface of the cone is turned so as to face away from the center of the stack. The edge of a container pushed up into the stack will therefore abut on the conical surface which acts as a guide and gives way due to the resilient suspension. When the edge of the container passes beyond the base of the cone the cones spring back to their home position, thereby retaining the container. When the desired number of containers is inserted in the stack holder the holder is swung laterally and the cones are turned so that their plane surfaces now face towards the center of the pile. Thereby the grippers release their hold at the edge of the lowermost container and the completed stack of containers may freely slide down onto the stacking table.

A third embodiment of the machine according to the invention is characterized in that one photosensor is height-adjustable permitting it to be set at a height above the surface of the height-adjustable conveyor belt corresponding to the height of a correctly placed container. The control unit is structured so that a signal from one photosensor activates the stop and the stack disc, while signals output simultaneously from said one photosensor and each of the other photosensors impedes activation of the stop and movement of the stack disc. A simpler adjustment of the photosensors is thus obtained in comparison with prior art photosensor arrangements of a similar type, in which several photosensors must detect at the same time the contour of the container in order to ascertain correct positioning.

Figure 2:
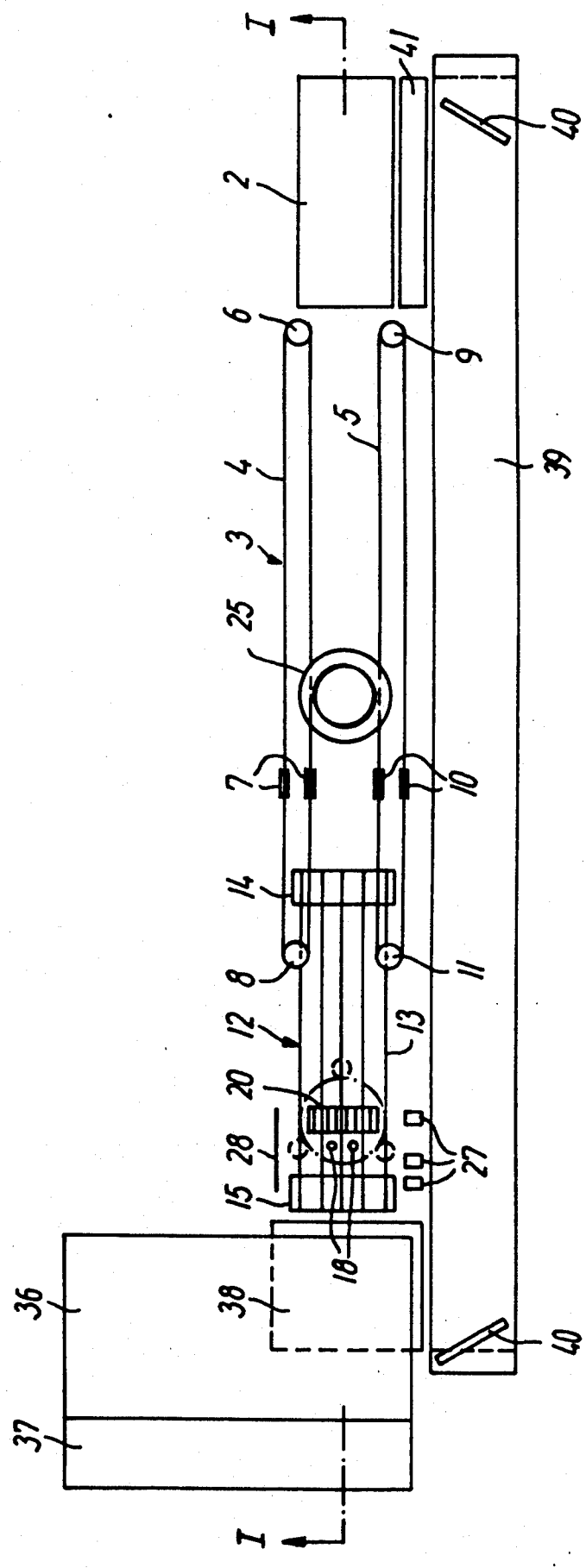
Figure 3:
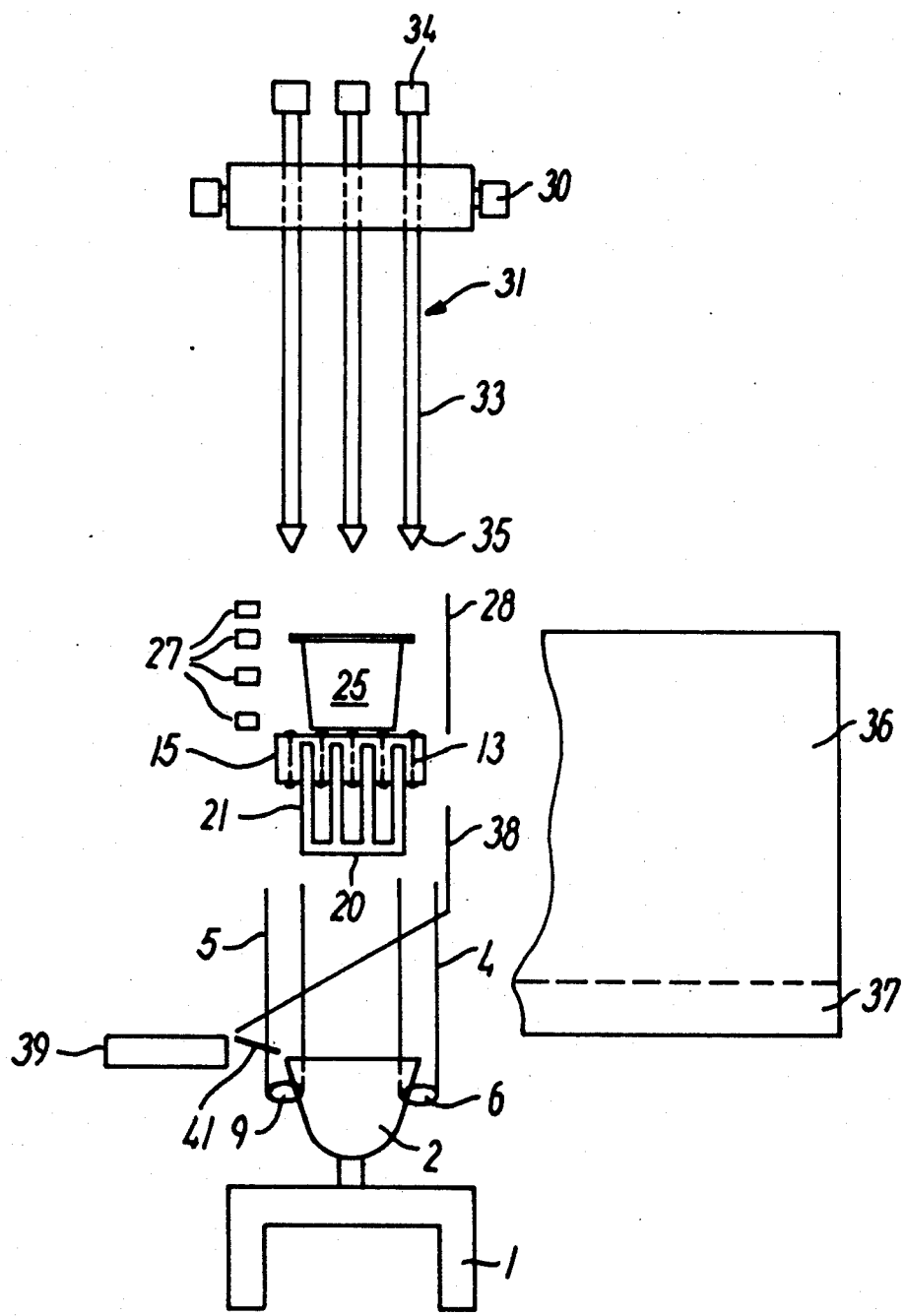
Figure 4:
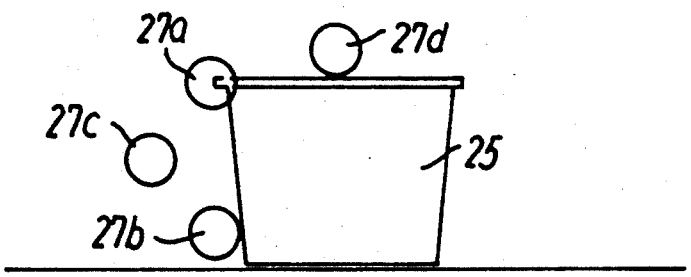
Figure 5:
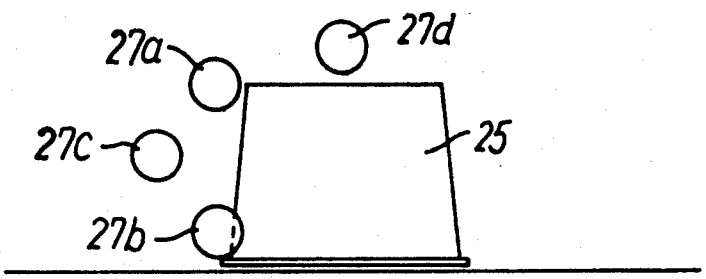
Figure 6:
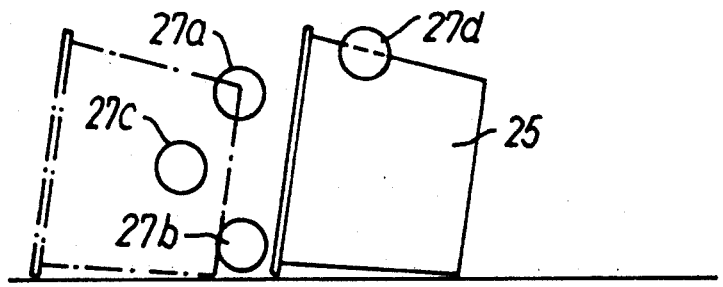
Figure 7:
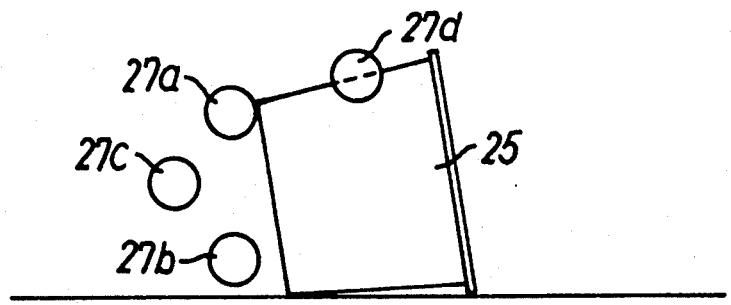
Figures 8, 9:
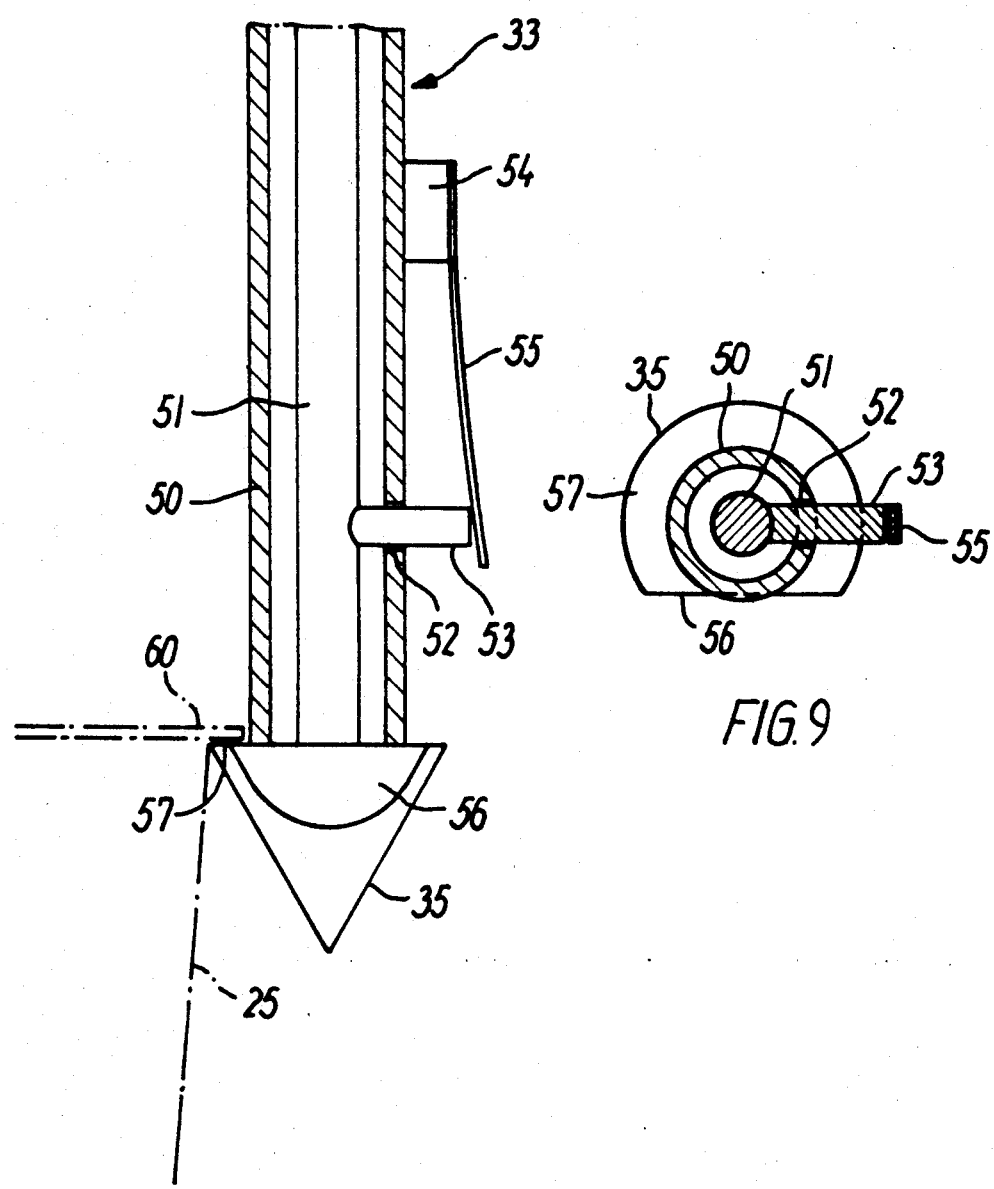

The invention will now be explained in detail by means of an example and with reference to the drawings, in which FIG. 1 is a schematic, sectional view along line I—I in FIG. 2, of a machine according to the invention, FIG. 2 is a top view of the machine in FIG. 1, FIG. 3 is a sectional view along line III—III in FIG. 1, FIG. 4 illustrates the location of the photosensors in relation to a correctly placed container, FIG. 5 is a view as in FIG. 4, where the container is in an upside-down position, FIG. 6 is a view as in FIG. 4, with the mouth of the container facing downstream, FIG. 7 is an illustration as in FIG. 4, with the bottom of the container facing downstream, FIG. 8 is a longitudinal section of a stack holder finger, and FIG. 9 is a cross-section of a stack holder finger.

As illustrated in FIGS. 1 to 3 the machine according to the invention has a frame 1 with an oscillating chute 2, located at the one end of a conveyor 3 consisting of two spaced apart, parallel round belts 4 and 5, each running over rollers 6, 7, 8, 9, 10, 11, respectively. The spacing between belts 4 and 5 is adjusted according to the size of the container body, preferably in such a manner that the belts grip the body just below the upper rim of the container 25 that is provided with a bead or a flange. A conveyor belt 12 formed by several spaced apart belts 13 running over rollers 14 and 15 is arranged in extension of conveyor 3. Conveyor belt 12 is supported by a frame 16 resting on legs 17 whose length is adjustable, e.g. by means of screw spindles. The frame carries a stop consisting of two pins 18 mounted on a compressed air cylinder, thereby allowing the pins upon activation of the cylinder to be pushed upwards between belts 13, thereby halting a container 25 advanced on belt 12. A stack disc 20 is also mounted on frame 16 and is reciprocated by a crank mechanism 22 driven by an airdriven rotating actuator 23. As it will most clearly appear from FIG. 3, disc 20 has on its upper surface a number of vertical plates 21 protruding between belts 13 of conveyor band 12. Several photosensors 27 adjustably carried by a holder indicated by 26 are further mounted on the frame. By raising and lowering frame 16 by means of the adjustable legs 17 the height of conveyor belt 12 may be adjusted according to the height of the containers 25 to be stacked.

Centrally above the stack disc 20 a stack holder 31 is suspended in a gallows 30 which in the illustrated example has three fingers 33 which, when viewed from above, are located at the apices of an isosceles triangle. At the lower end each finger has a gripper 35 activated by a rotatable cylinder 34 located at the upper end of the finger. The construction of the gripper will be explained later on with reference to FIGS. 8 and 9. The stack holder 33 may be pivoted about a shaft 32 in gallows 30 to point along the surface of an inclined stacking table 36 having at its bottom a longitudinally extending shelf 37.

From the discharge end of conveyor belt 12 a return chute runs to a conveyor belt 39 at the discharge end of which a chute 41 slopes towards the oscillating chute 2. The conveyor belt 39 has guides 40 at either end for guiding containers on to and out from the belt.

The machine includes four photosensors in combination with a reflecting screen 28 for detecting the position of the container on conveyor belt 12. As illustrated in FIG. 4, a photosensor 27a is located in line with the area of the upper edge of the container. Vertically beneath the photosensor 27a there is disposed a second photosensor 27b in the area just above the upper side of conveyor belt 12. A third photosensor 27d is situated upstream of photo-sensor 27a in the area just above the upper edge of the container and approximately opposite the center line of the container when its front edge is opposite photosensor 27a. A fourth photosensor 27c is arranged downstream of photosensor 27a at a height approximately midway between the height of photosensor 27a and photosensor 27b. Consider now, the container 25 moving from right to left in the figure, it will be seen that 27a is the first photosensor detecting the container when passing and that this happens at a point when none of the remaining photosensors has detected the container. Therefore, a signal is emitted to activate stop 18 and stack disc 20.

In the position of the container 25 illustrated in FIG. 5 the container is at first detected by the photosensor 27b. It is recognized that the photosensor 27a alone will not be capable of detecting the container throughout its passing.

FIGS. 6 and 7 illustrate that neither will the photosensor 27a alone be capable of detecting the container in the situations illustrating the container in horizontal position.

As illustrated in FIG. 8, a stack holder finger 33 is made as a tube 50 enclosing a shaft 51 carrying at its lower end a conical body 35. On the side of tube 50 facing away from the stack there is mounted a block 54 carrying a leaf spring 55 abutting at its free end on a pressure pin 53 that is inserted through a bore 52 in tube 50 and rests on shaft 51.

The conical body 35 has a vertical surface 56 located at a distance from the axis of the cone corresponding to the outer radius of tube 50.

In dot-and-dash lines FIG. 8 shows the contour of part of a container 25 whose upper edge rests on the base 57 of cone 35. When a container is lifted towards the cone it will be recognized that the cone will move sideways against the pressure from leaf spring 55 allowing the container edge to be positioned in the illustrated height. The cone then springs back, thereby preventing the container from falling down. By rotating shaft 51 so that the surface 56 faces the container, the container will be released and slide down from the stack holder.

The machine operates in the following manner. The containers are supplied in a continuous flow, e.g. from a plastics moulding machine to the oscillating chute 2. Due to the vibrations and shape of the chute the containers are passed towards conveyor 3 in which they are aligned so as to be approximately vertically suspended, following which they are passed upwards to the height-adjustable conveyor belt 12. The photosensors 27 disposed laterally of conveyor belt 12 detect the position of the container, as described above. If the container is correctly placed, stop 18 is activated and halts the container, following which it is carried up into stack holder 31 by stack disc 20. If the position of the container on conveyor belt 12 is not correct, stop 18 remains in its passive position and the container is passed further onwards to the return chute 38 and returns on conveyor belt 39 to the oscillating chute 2.

When the desired number of containers has been inserted into stack holder 31, the holder will be pivoted about shaft 32 and the rotating means 34 activated, thereby releasing the stack which slides down onto the shelf 37 of stacking table 36. The stacking table may in a known manner have a so-called elevator receiving the stack and carrying it down towards shelf 37 and a pusher device displacing the stack along the surface of the table, thereby giving way to a new stack. Said devices are well known to a skilled person and have therefore not been further described or shown.

I claim:

1. A machine for stacking cup-shaped containers (25), comprising: an oscillating chute (2) and a conveyor (3) feeding the containers in an upright position to a height-adjustable conveyor belt (12), a plurality of photosensors (27) to detect, in connection with a programmable control unit, the orientation of a container on the conveyor belt (12), a stop (18) to halt a container under a stack holder (31) which at its downwards facing end has releasable grippers (35), a vertically displaceable stack disc (20) for lifting said container to the stack holder, and means (39) for returning an incorrectly oriented container to the oscillating chute, wherein the stack holder (31), the stop (18) and the stack disc (20) are positioned relative to a point on the height-adjustable conveyor belt (12) at which the orientation of the container (15) is detected by said photosensors (27) immediately prior to stacking, said stop (18) being activated to move between a passive position allowing movement of the container (25) past the stop and an active position preventing said movement and stopping the container (25) in response to detection by said photosensors (27) that the container 25 is correctly oriented on the conveyor belt (12).

2. A machine according to claim 1, wherein the height-adjustable conveyor belt (12) comprises several belts (13) spaced apart and extending in parallel, the stop comprises at least two pins (18) which in their active position project upwards between the belts (13) above the upper side of the conveyor belt (12) and in their passive position are located therebeneath, and the stack disc (20) is constituted by a number of spaced apart, vertical plates (21) passing during the lifting movement of the disc (20) from below through the interspaces between the belts (13).

3. A machine according to claim 1 wherein the means for returning an incorrectly placed container (25) is a conveyor belt (39) extending form the discharge end of the height-adjustable conveyor belt (12) to the oscillating chute (2).

4. A machine as claimed in claim 1, including fingers (33), each of the fingers including a tube (50) enclosing a shaft (51) suspended at its top end by a turning means (34) and terminating at the lowermost end with a downwards pointing cone (35) whose base diameter (57) is larger than the outer diameter of the tube (50), said cone (35) having a plane surface (56) that is parallel to a principle axis of the cone and said plane surface is spaced apart from said axis by a distance corresponding to an outer radius of the tube, and the tube (50) at its lowermost end, on a side facing away from the center line of the stack holder, has a bore (52) with a pressure pin (53) restrained between the shaft (51) and a leaf spring (55) mounted on the external side of the tube.

5. A machine as claimed in claim 1, wherein one of the plurality of photosensors (27a) is height-adjustable permitting it to be set at a height above the surface of the height-adjustable conveyor belt (12) corresponding to the height of a correctly placed container (25), and the control unit is structured so that a signal from said one photosensor (27a) activates the stop (18) and the stack disc (20), while signals output simultaneously form said one photosensor (27a) and are of the other of the plurality of photosensors (27b, 27c, 27d) impedes activation of the stop (18) and movement of the stack disc (20).

6. A machine according to claim 2, wherein the means for returning an incorrectly placed container (25) is a conveyor belt (39) extending from the discharge end of the height-adjustable conveyor belt (12) to the oscillating chute (2).

7. A machine as claimed in claim 2, wherein the stack holder (31) including fingers (33), each of the fingers including a tube (50) enclosing a shaft (51) suspended at its top end by a turning means (34) and terminated at the lowermost end with a downwards pointing cone (35) whose base diameter (57) is larger than the outer diameter of the tube (50), said cone (35) having a plane surface (56) that is parallel to a principle axis of the cone and said plane surface is spaced apart from said axis by a distance corresponding to the outer radius of the tube, and the tube (50) at its lowermost end, on a side facing away form the center of the stack holder, has a bore (52) with a pressure pin (53) restrained between the shaft (51) and a leaf spring (55) mounted on the external side of the tube.

8. A machine as claimed in claim 3, wherein the stack holder (31) including fingers (33), each of the fingers including a tube (50) enclosing a shaft (51) suspended at its top end by a turning means (34) and terminating at the lowermost end with a downwards pointing cone (35) whose base diameter (57) is larger than the outer diameter of the tube (50), said cone (35) having a plane surface (56) that is parallel to a principle axis of the cone and said plane surface is spaced apart from said axis by a distance corresponding to the outer radius of the tube, and the tube (50) at its lowermost end, on a side facing away form the center line of the stack holder, has a bore (52) with a pressure pin (53) restrained between the shaft (51) and a leaf spring (55) mounted on the external side of the tube.

9. A machine as claimed in claim 2, wherein one photosensor (27a) is height-adjustable permitting it to be set at a height above the surface of the height-adjustable conveyor belt (12) corresponding to the height of a correctly placed container (25), and the control unit is structured so that a signal from said one photosensor (27a) activates the stop (18) and the stack disc (20), while signals output simultaneously from said one photosensor (27a) and one of the other of said plurality of photosensors (27b, 27c, 27d) impedes activation of the stop (18) and movement of the stack disc (20).

10. A machine as claimed inc claim 3, wherein one photosensor (27a) is height-adjustable permitting it to be set at a height above the surface of the height-adjustable conveyor belt (12) corresponding to the height of a correctly placed container (25), and the control unit is structured so that a signal from said one photosensor (27a) activates the stop (18) and the stack disc (20), while signals output simultaneously from said one photosensor (27a) and one of the other of said plurality of photosensors (27b, 27c, 27d) impedes activation of the stop (18) and movement of the stack disc (20).

11. A machine as claimed in claim 4, wherein one photosensor (27a) is height-adjustable permitting it to be set at a height above the surface of the height-adjustable conveyor belt (12) corresponding to the height of a correctly placed container (25), and the control unit is structured sot hat a signal from said one photosensor (27a) activates the stop (18) and the stack disc (20), while signals output simultaneously from said one photosensor (27a) and one of the other of said plurality of photosensors (27b, 27c, 27d) impedes activation of the stop (18) and movement of the stack disc (20).

* * * * *